(12) United States Patent
Hicks

(10) Patent No.: US 8,068,184 B2
(45) Date of Patent: *Nov. 29, 2011

(54) SMART REMOTE CONTROL

(75) Inventor: James E. Hicks, Laguna Beach, CA (US)

(73) Assignee: Mitsubishi Electric Visual Solutions America, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,208

(22) Filed: Aug. 20, 2010

(65) Prior Publication Data

US 2010/0309389 A1    Dec. 9, 2010

Related U.S. Application Data

(63) Continuation of application No. 11/359,881, filed on Feb. 21, 2006, now Pat. No. 7,782,407.

(51) Int. Cl.
*H04N 5/44* (2006.01)
*H04N 5/268* (2006.01)

(52) U.S. Cl. ........................ 348/734; 348/706

(58) Field of Classification Search .......... 348/705, 348/706, 734, 569, 552, 725; 725/38, 78, 725/80, 81; 340/825.69–825.72, 12.52, 12.53; 398/112; 710/62–64, 72, 73

See application file for complete search history.

(56) References Cited

U.S. PATENT DOCUMENTS

| | | | |
|---|---|---|---|
| 6,538,556 B1 | 3/2003 | Kawajiri | |
| 6,993,722 B1 * | 1/2006 | Greer et al. | 715/739 |
| 7,474,248 B2 * | 1/2009 | Nakamura et al. | 341/176 |
| 7,811,173 B2 * | 10/2010 | Lau et al. | 463/43 |
| 2001/0005197 A1 | 6/2001 | Mishra et al. | |
| 2001/0024164 A1 | 9/2001 | Kawamura et al. | |
| 2005/0246747 A1 | 11/2005 | Braun et al. | |
| 2006/0041655 A1 | 2/2006 | Holloway et al. | |
| 2007/0290876 A1 | 12/2007 | Sato et al. | |

* cited by examiner

*Primary Examiner* — Victor Kostak
(74) *Attorney, Agent, or Firm* — Orrick, Herrington & Sutcliffe LLP

(57) ABSTRACT

A remote control unit for an entertainment system comprising a television or other display device, and a plurality of peripheral devices connected to the televisions. The remote control unit is adapted to send and receive information signals to and from the television and to the peripheral devices to control the devices. The television and remote control unit both preferably includes a receiver and transmitter and appropriate memory and logic coupled to the transmitter and receiver. Alternatively, the remote control unit preferably includes a receiver and transmitter and a repeater coupled to the receiver and the transmitter. In operation, the remote control unit sends commands to the television, which responds by sending information or a specific command back to the remote control unit. The remote control unit then retrieves and sends a specific command or repeats and sends the command received from the television to the appropriate peripheral device.

19 Claims, 3 Drawing Sheets

SMART REMOTE CONTROL

CROSS-REFERENCE TO RELATED APPLICATION

This application is a continuation of application Ser. No. 11/359,881 filed Feb. 21, 2006, now U.S. Pat. No. 7,782,407, which application is fully incorporated herein by reference.

FIELD

The present invention relates generally to television remote control units, and more particularly to a smart remote control that facilitates wireless control of the television and peripheral devices connected to the television using a single remote and a single control layer.

BACKGROUND

Controlling and switching between peripheral devices, such as VCRs, DVDs, A/V receivers, and the like, connected to a television is often fraught with difficulty as the consumer typically switches between multiple remote control units or switches between multiple layers on a universal remote control unit. In an alternative method to switching between multiple remote control units or between control layers on a universal remote control unit to control peripheral devices, the television is used to convert generic command codes received from a remote control unit to device specific command codes and directs the command codes to connected peripherals by directing signals to emitters connected to the ends of long cables and placed in front of the devices' receivers. See, e.g., U.S. application Ser. No. 10/138,702, entitled "Control System and User Interface for Network of Input Devices," filed May 2, 2002, which is incorporated by reference. As depicted in FIG. 1, generic IR control signals 12 are received by the television 10, or other displace device, from a remote control unit 11 and, in response, a television 10 sends device specific IR signals down IR blaster cables 18 to emitters 17 connected to the ends of the cable 18. The signals 16 are broadcast from the emitters 17 to peripheral devices such as, e.g., a VCR 15, DVD 14 and the like, which are connected to the television 10 or other display device over media signal cables 13.

The use of blaster cables, however, increases the cost of the base television. In addition, the blaster cables increase the complexity of the installation of the peripheral devices as the end user must string the cables to each peripheral and locate the emitter in front of the IR receiver of each device.

Therefore, it would be desirable to provide a remote control unit that facilitates the control of peripheral devices connected to a television set.

SUMMARY

The present disclosure is directed to an improved apparatus and method that facilitates control of peripheral devices connected to the television set or other display device. In a preferred embodiment, an entertainment system comprises a television, a monitor or other display device, a plurality of peripheral devices connected to the televisions, and a remote control unit adapted to send and receive information to and from the television and to the peripheral devices, preferably via IR or RF signals. The television preferably includes, among other things, a receiver, a transmitter and a CPU microprocessor or the like, coupled to the receiver and transmitter. The receiver and the transmitter are preferably adapted to receive and transmit IR signals, RF signals, or the like. The CPU preferably includes, among other things, non-volatile memory and logic. The remote control unit, preferably includes, among other things, a receiver, a transmitter and a repeater coupled to the receiver and the transmitter. Like the receiver and the transmitter of the television or other display device, the remote control units receiver and transmitter are preferably adapted to receive and transmit IR signals, RF signals, or the like.

In an alternative embodiment, the remote control unit preferably includes, but is not limited to, a receiver, a transmitter and logic and non-volatile memory coupled to the receiver and the transmitter.

In operation, the remote control unit preferably sends IR or RF commands to the television, which responds by sending information via IR or RF signals back to the remote control unit. The remote control unit then sends, via an IR or RF signal, a specific command retrieved from memory or repeats a command received from the television or other display device to the appropriate peripheral device.

Other objects and features of the present invention will become apparent from consideration of the following description taken in conjunction with the accompanying drawings.

DETAILED DESCRIPTION

Each of the additional features and teachings disclosed below can be utilized separately or in conjunction with other features and teachings to provide an improved apparatus and method that facilitates control of peripheral devices connected to the television set. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
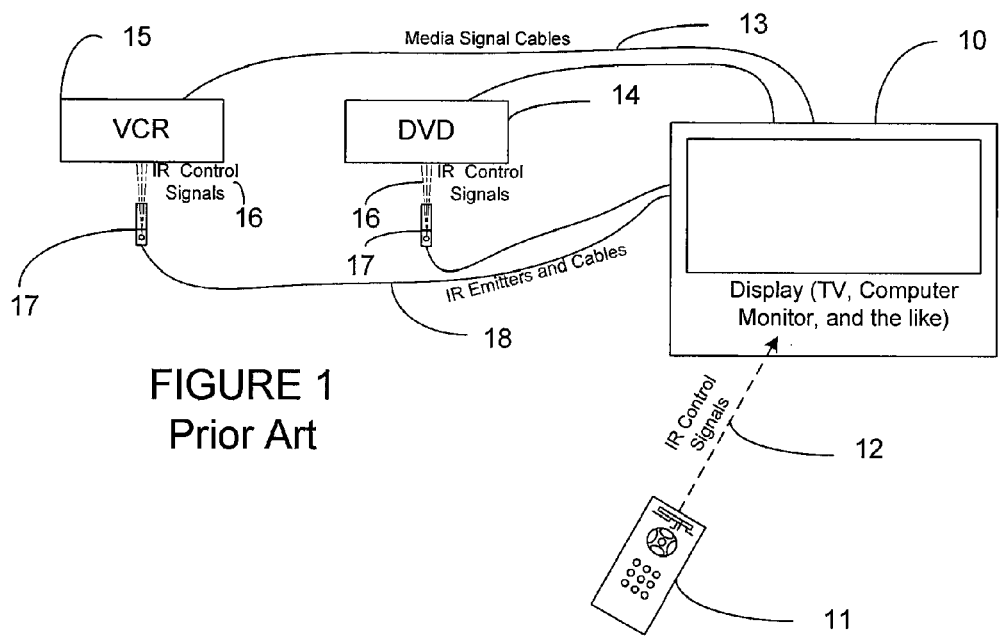
FIG. 1 is a plan view of a prior art system using IR blaster cables and emitters to control peripheral devices connected to a television set.
Figure 2:
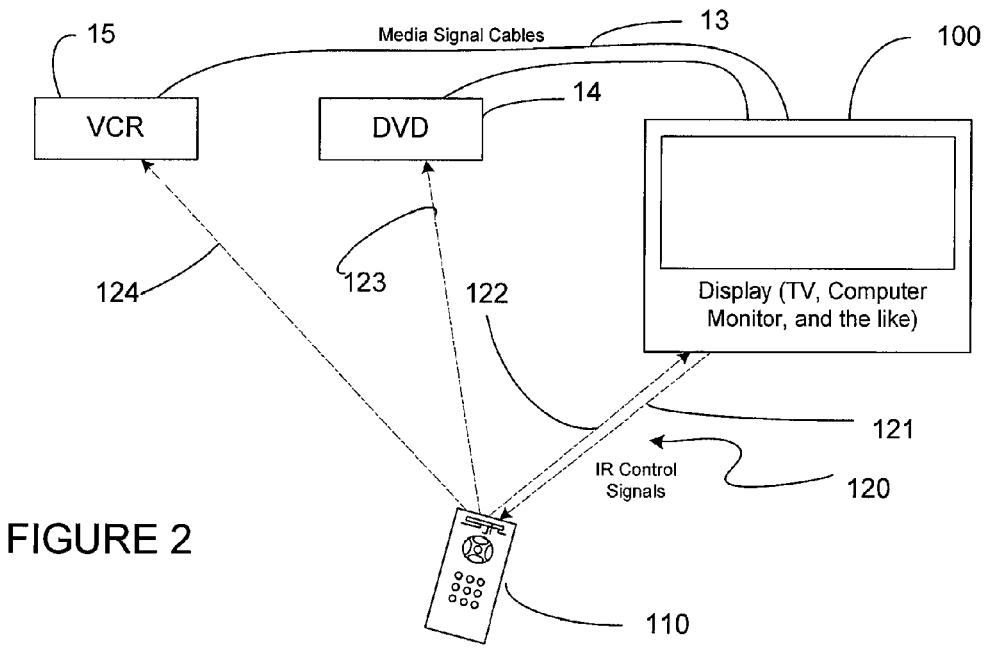
FIG. 2 is a plan view of a system showing control of peripheral devices connected to a television set using a remote control unit of a preferred embodiment.
Figure 3:
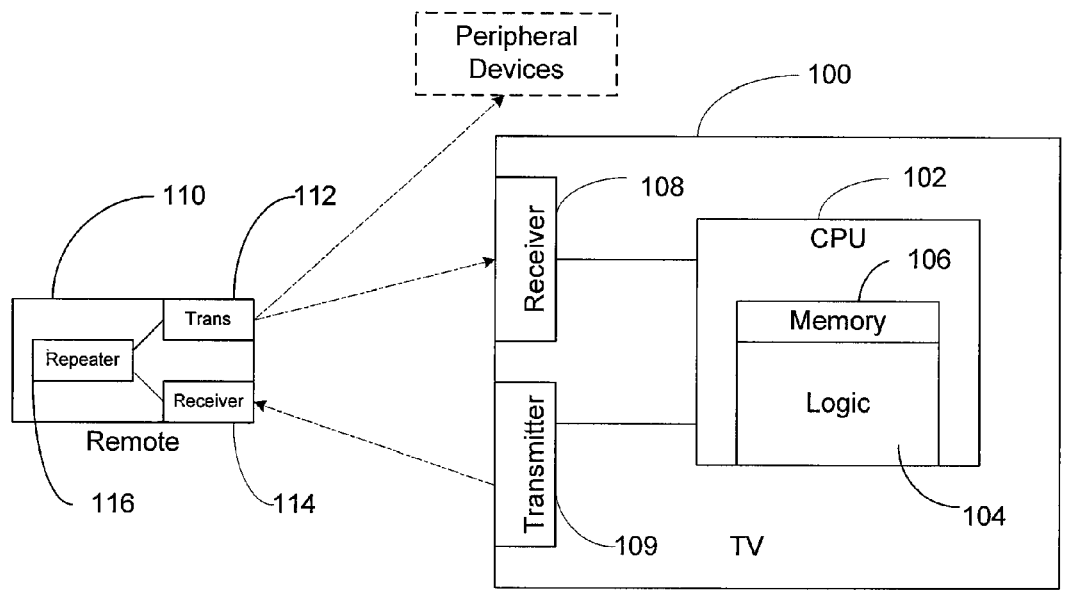
FIG. 3 is a schematic of the remote control unit and television in accordance with a preferred embodiment.
Figure 4:
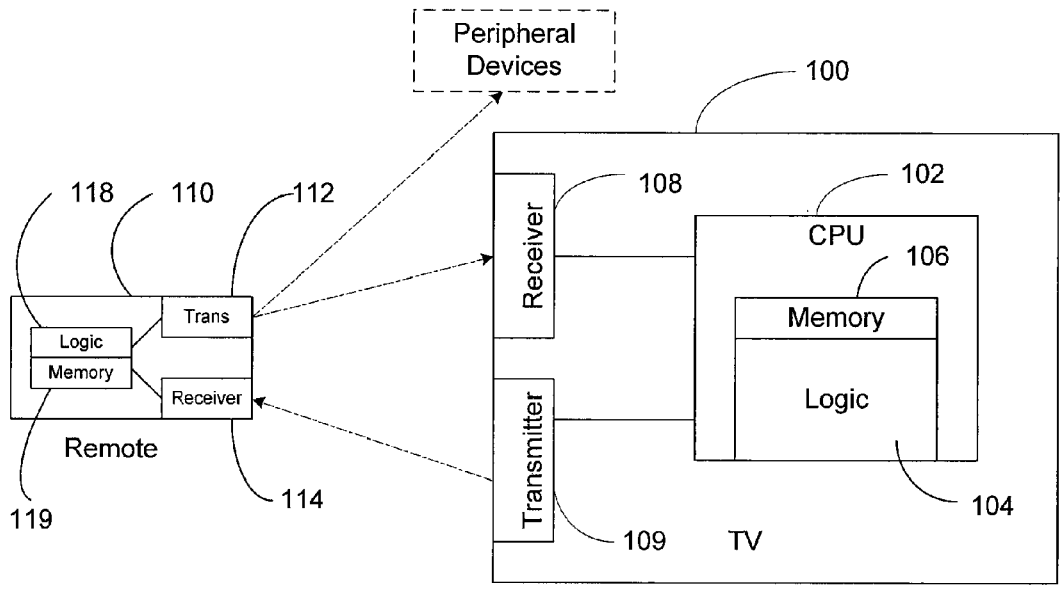
FIG. 4 is a schematic of the remote control unit and television in accordance with another preferred embodiment.

Turning to FIG. 2, a preferred embodiment is shown to include an entertainment system comprising a television 100 or other display device, a DVD 14 and a VCR 15 coupled together over media signal cables 13, and a remote control unit 110 communicatively coupled to the television set 100. The remote control unit 110 is adapted to send and receive information via IR or RF signals 120, and the like, to the television 100, the DVD 14, and the VCR 15, and other peripheral devices (not shown) connected to the television 100. As depicted in FIGS. 3 and 4, the television 100 preferably includes, among other things, a receiver (detector) 108, a transmitter 109 and a CPU microprocessor 102, or the like, coupled to the receiver 108 and transmitter 109. The CPU 102 preferably includes, among other things, non-volatile memory 106 and logic 104. The logic 104, in response to a command received from the remote control unit 110, is preferably adapted to, among other things, identify the peripheral device being displayed on the television 100 and retrieve from the television memory 106 a device specific command code corresponding to the generic command received from the remote control unit 110. The receiver 108 and transmitter 109 are preferably adapted to receive and transmit IR signals, RF signals, or the like.

The remote control unit 110, as depicted in FIG. 3, preferably includes, among other things, a receiver 114, a transmitter 112 and a repeater 116 coupled to the receiver 114 and the transmitter 112. In an alternative, the remote control unit 110, as depicted in FIG. 4, preferably includes logic 118 and memory 119 coupled to the receiver 114 and the transmitter 112. The logic 118 is preferably adapted to retrieve from the remote control memory 119 a device specific command code in response to receipt of the identification from the television 100 of the peripheral device being displayed on the television 100. The receiver and transmitter are preferably adapted to receive and transmit IR signals, RF signals, or the like.

In operation, as depicted in FIG. 2, the remote control unit 110 sends generic commands 122 to the television 100, which in response sends information signals 121 back to the remote control unit 110. The remote control unit 110 then sends a specific command retrieved from memory or just repeats a command 123 or 124 it received from the television to the appropriate peripheral device 14 or 15.

Figure 5:
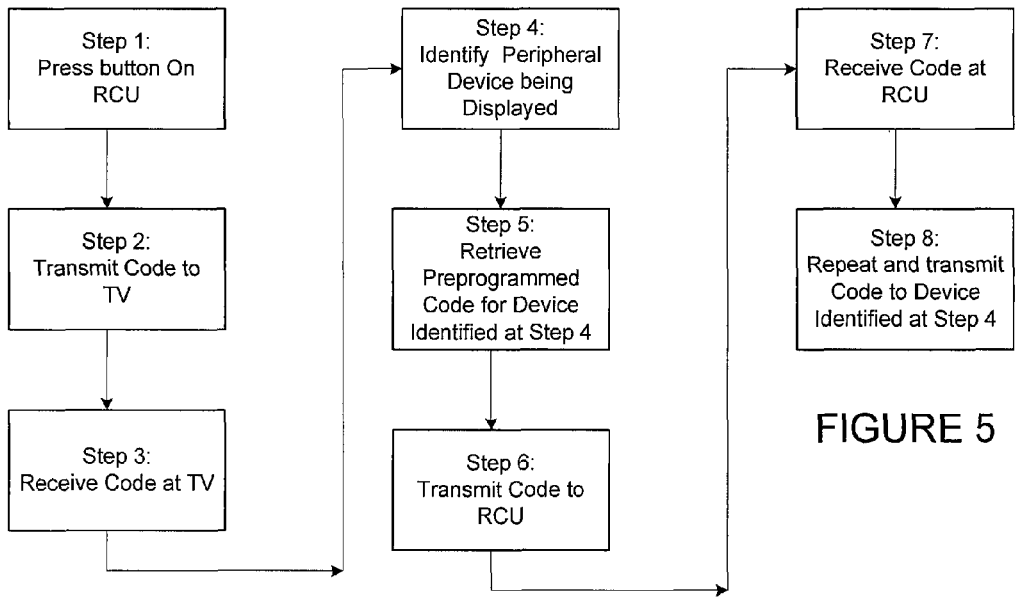
FIGS. 5 and 6 are flow diagrams showing the operation of the system shown in FIG. 2.
Figure 6:
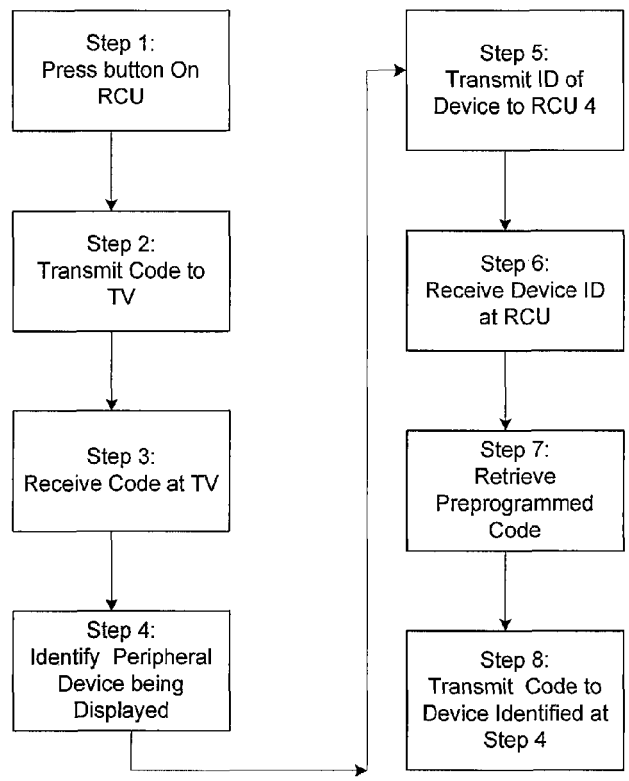

The detail steps of operation of the remote control unit 110 and television 100 are shown in FIGS. 5 and 6. The user could be watching the DVD player 14 and then, in Step 1, presses a button, e.g., the "stop" button, on the remote control unit 110. In Step 2, the remote control unit 110 transmits the "stop" code via an IR or RF signal 122 to the television 100. The receiver 108 of the television 100 receives the "stop" code signal in Step 3 and the television logic 104 then, in Step 4, identifies the peripheral device being displayed on the television 100. In Step 5, the logic 104 retrieves the specific preprogrammed "stop" code for the DVD player 14 stored in the television memory 106. An example of Steps 4 and 5 is described in greater in U.S. application Ser. No. 10/138,702, which is incorporated by reference.

The specific "stop" code for the DVD player 14 is then transmitted by the transmitter 109, at Step 6, to the remote control unit 110 via IR or RF signals 121. The receiver 114 of the remote control unit 110 receives the specific "stop" code signal in Step 7 and then, in Step 8, the repeater 116 and transmitter 112 repeat and transmit the "stop" command via IR or RF signals 123 to the DVD player 14.

Turning to FIG. 6, in an alternative embodiment, the user could again be watching the DVD player 14 and then, in Step 1, press a button, e.g., the "stop" button, on the remote control unit 110. In Step 2, the remote control unit 110 transmits the "stop" code via an IR or RF signal 122 to the television 100. The receiver 108 of the television 100 receives the "stop" code signal in Step 3 and the television logic 104 then, in Step 4, identifies the peripheral device being displayed on the television 100. In Step 5, the transmitter 109 of the television 100 sends information to the remote control unit 110 that the television 100 is displaying the DVD 14. The receiver 114 of the remote control unit 110 receives the information regarding the device being displayed in Step 6 and then, in Step 7, the remote control unit logic 118 retrieves the preprogrammed "stop" IR command for the peripheral device from the remote control unit memory 119. In Step 8, transmitter 112 transmits the retrieved "stop" command via IR or RF signals 123 to the DVD player 14.

The particular examples set forth herein are instructional and should not be interpreted as limitations on the applications to which those of ordinary skill are able to apply this device. Modifications and other uses are available to those skilled in the art which are encompassed within the spirit of the invention as defined by the scope of the following claims.

What is claimed is:

1. A television system comprising
   a television having a receiver and a transmitter, wherein the television is couplable to a plurality of peripheral devices connected to the television, and
   a remote control unit having a receiver and a transmitter, wherein in response to a signal comprising a generic device command received from the remote control unit the television being configured to identify a peripheral device whose program signal the television is programmed to receive and display, and transmit information to the remote control unit corresponding to the peripheral device whose program signal the television is programmed to receive and display, wherein the remote control unit being configured to receive information from the television and transmit a device specific command corresponding to the information received from the television to the peripheral device whose program signal the television is programmed to receive and display.

2. The system of claim 1 wherein the information transmitted by the television is a specific device command and the remote control unit includes a repeater coupled to the receiver and transmitter to repeat the specific device command received from the television.

3. The system of claim 1 wherein the remote control unit includes logic and memory coupled to the receiver and transmitter to retrieve a specific device command from memory that corresponds to the information received from the television.

4. A method for controlling peripheral devices connected to a television, comprising the steps of
   sending generic device commands from a remote control unit to a television,
   the television identifying a peripheral device whose program signal the television is programmed to receive and display, sending information from the television to the remote control unit corresponding to the peripheral device whose program signal the television is programmed to receive and display, and sending a device command specific to the peripheral device whose program signal the television is programmed to receive and display from the remote control unit to the peripheral device whose program signal the television is programmed to receive and display.

5. The method of claim 4 wherein the step of sending information from the television to the remote control unit corresponding to the peripheral device w whose program signal the television is programmed to receive and display includes the remote control unit receiving a specific device command from the television and repeating the command.

6. The method of claim 4 further comprising the step of receiving information from the television identifying the peripheral device whose program signal the television is programmed to receive and display and retrieving the specific device command from memory in the remote control.

7. A method for controlling peripheral devices connected to a television, comprising the steps of pressing a button on a remote control unit, transmitting a generic device command code corresponding to the depressed button to a television, receiving the generic device command code signal at a receiver of the television, the television identifying a peripheral device whose program signal the television is programmed to receive and display, transmitting information from the television to the remote control unit corresponding to the identified peripheral device, and transmitting a specific command code corresponding to the information received from the television from the remote control unit to the identified peripheral device without depressing any buttons.

8. The method of claim 7 further comprising the step of retrieving a specific preprogrammed command code for the identified peripheral device.

9. The method of claim 8 wherein the command code is stored in memory on the television.

10. The method of claim 8 wherein the command code is stored in memory on the remote control unit.

11. The method of claim 8 wherein the information transmitted to the remote control unit is the preprogrammed command code.

12. The method of claim 11 wherein the step of transmitting a specific command code includes repeating the preprogrammed command code received from the memory of the remote control unit.

13. The method of claim 11 further comprising the step of retrieving from memory of the remote control a preprogrammed command code for the peripheral device identified as the peripheral device whose program signal is being displayed on the television.

14. A method for controlling peripheral devices connected to a television using one remote control and one control layer on the remote control, comprising the steps of transmitting a generic device command to a television, wherein the television being configured to identify a peripheral device whose program signal the television is programmed to receive and display, receiving a information from the television corresponding to the peripheral device whose program signal the television is programmed to receive and display, sending a command without further user input to the peripheral device whose program signal the television is programmed to receive and display based on the information received from the television.

15. The method of claim 14 wherein the information includes the identification of a peripheral device whose program signal the television is programmed to receive and display.

16. The method of claim 14 wherein the information includes a command code for a peripheral device whose program signal the television is programmed to receive and display.

17. The method of claim 16 further comprising the step of repeating the command.

18. The method of claim 15 further comprising the step of retrieving the command code stored in memory of the remote control unit.

19. The method of claim 16 further comprising the step of retrieving the command code stored in the memory of the television.

* * * * *